(12) United States Patent
Cunnick

(10) Patent No.: US 12,154,174 B2
(45) Date of Patent: *Nov. 26, 2024

(54) INTER-PRODUCT MATRIX

(71) Applicant: TRADING TECHNOLOGIES INTERNATIONAL, INC., Chicago, IL (US)

(72) Inventor: Charles W. Cunnick, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,119

(22) Filed: Dec. 13, 2023

(65) Prior Publication Data

US 2024/0127341 A1    Apr. 18, 2024

Related U.S. Application Data

(63) Continuation of application No. 17/384,174, filed on Jul. 23, 2021, now Pat. No. 11,900,456, which is a continuation of application No. 16/514,188, filed on Jul. 17, 2019, now Pat. No. 11,120,500, which is a continuation of application No. 16/103,604, filed on Aug. 14, 2018, now Pat. No. 10,410,286, which is a continuation of application No. 15/792,299, filed on Oct. 24, 2017, now Pat. No. 10,089,689, which is a continuation of application No. 14/677,360, filed on Apr. 2, 2015, now Pat. No. 9,830,657.

(51) Int. Cl.
*G06Q 40/04* (2012.01)
*G06Q 30/0601* (2023.01)

(52) U.S. Cl.
CPC ......... *G06Q 40/04* (2013.01); *G06Q 30/0633* (2013.01)

(58) Field of Classification Search
CPC .................................................... G06Q 40/04
See application file for complete search history.

(56) References Cited

U.S. PATENT DOCUMENTS 9,830,657 B2   11/2017   Cunnick
10,089,689 B2   10/2018   Cunnick
(Continued)

OTHER PUBLICATIONS

Bolgun, Kaan Evren; "Dynamic Pairs Trading Strategy for the companies listed . . . "; International Review . . . , Brussels, vol. 2, Iss. 1, 2010. (Year: 2010).

*Primary Examiner* — Edward Chang
(74) *Attorney, Agent, or Firm* — McDonnell Boehnen Hulbert & Berghoff LLP

(57) ABSTRACT

Lists of tradeable objects may be generated and displayed to enable a user to define a trading strategy having multiple legs. The lists of tradeable objects may be used to define and display different combinations of the tradeable objects that are included in each of the lists. Each combination of tradeable objects may define the different legs of a spread that may be tradeable on one or more exchanges. A combination of tradeable objects may be selected to display contract information associated with the different legs of the spread. The contract information for each leg may be used to define and display spread information for the legs of the trading strategy. The spread information may allow the user to view information related to the spreads for different combinations of tradeable objects in a display.

9 Claims, 14 Drawing Sheets

(56) References Cited

U.S. PATENT DOCUMENTS

| | | |
|---|---|---|
| 10,410,286 B2 | 9/2019 | Cunnick |
| 2012/0130880 A1 | 5/2012 | Garlanger et al. |
| 2014/0372853 A1* | 12/2014 | Barry .................. G06F 3/04817 |
| | | 715/212 |
| 2016/0292785 A1 | 10/2016 | Cunnick |
| 2018/0060963 A1 | 3/2018 | Cunnick |
| 2018/0374156 A1 | 11/2018 | Cunnick |
| 2019/0340687 A1 | 11/2019 | Cunnick |

* cited by examiner

INTER-PRODUCT MATRIX

CROSS REFERENCE TO RELATED APPLICATIONS

This application is a continuation of U.S. patent application Ser. No. 17/384,174, filed Jul. 23, 2021, which is a continuation of U.S. patent application Ser. No. 16/514,188, filed on Jul. 17, 2019, now U.S. Pat. No. 11,120,500, which is a continuation of U.S. patent application Ser. No. 16/103,604, filed on Aug. 14, 2018, now U.S. Pat. No. 10,410,286, which is a continuation of U.S. patent application Ser. No. 15/792,299, filed on Oct. 24, 2017, now U.S. Pat. No. 10,089,689, which is a continuation of U.S. patent application Ser. No. 14/677,360, filed on Apr. 2, 2015, now U.S. Pat. No. 9,830,657, the entire contents of each of which are incorporated herein by reference for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

The trading device displays the information about the market to a user via one or more display windows, such that the user can view the market information for submitting order messages to the electronic exchange. The trading devices generally display market information related to different electronic exchanges in different display windows. Users can create different trading strategies on the trading device based on the market information from different exchanges, which may cause the user to have to view market information in multiple display windows to create a trading strategy related to orders. For example, users may define a trading strategy that involves a synthetic spread that is based on contracts at different exchanges.

As the market information for different exchanges is generally provided in different display windows, creating trading strategies involving synthetic spreads, or other trading strategies that use market information from different exchanges, may be difficult and time consuming for the user. Due to the limited size of a user display, a user attempting to view market information from different electronic exchanges may have to view information within a compact area of the display or continue to transition between different display windows to follow a market or execute a trade.

BRIEF DESCRIPTION OF THE FIGURES

Certain embodiments are disclosed with reference to the following drawings.

Figure 1:
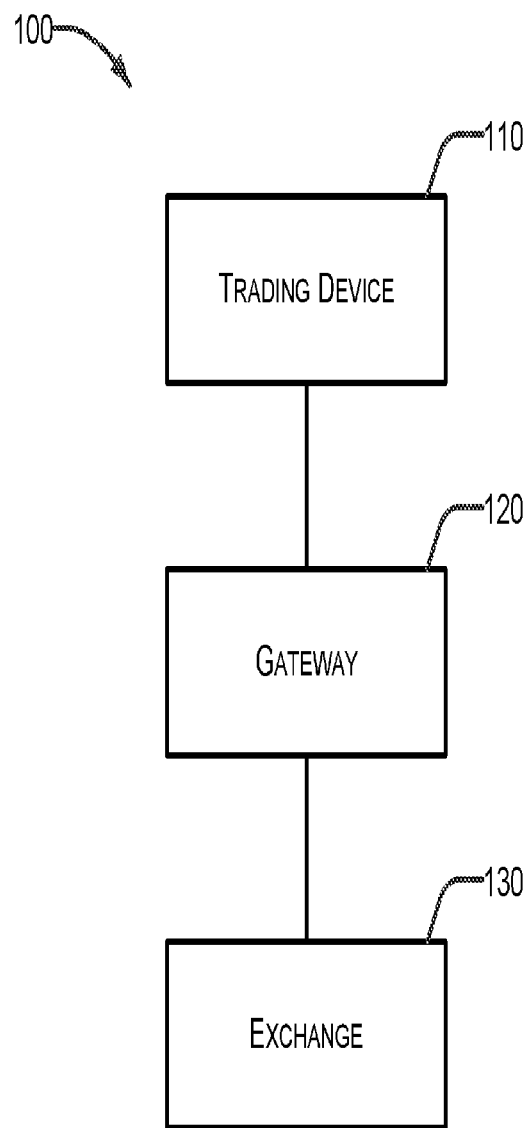
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

Systems, methods, and apparatus are described herein for generating and/or displaying information related to tradeable objects offered at one or more exchanges. A user may select one or more lists of tradeable objects for defining a trading strategy. The lists of tradeable objects may be used to define and display different combinations of the tradeable objects that are included in each of the lists. Each combination of tradeable objects may define the different legs of a synthetic spread that may be tradeable on one or more exchanges.

The user may select a combination of tradeable objects to display contract information related to the tradeable objects. The contract information may indicate a list of future contracts for each leg of the trading strategy over a period of time. The contract information for each leg may be used to define and display spread information for the legs of the trading strategy. The spread information may allow the user to view information related to the spreads for different combinations of tradeable objects in a display. For example, the spread information may include a price or a net change for different combinations of tradeable objects.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. BRIEF DESCRIPTION OF CERTAIN EMBODIMENTS

Systems, methods, and apparatus are described herein for generating and/or displaying information related to tradeable objects offered at exchanges. As described herein, a list of tradeable objects offered at an exchange may be displayed along a first axis. A list of tradeable objects offered at an exchange may be displayed along a second axis. The list of tradeable objects displayed along the first and second axes may be the same or different. The list of tradeable objects displayed along the first axis may be aligned orthogonal to the list of tradeable objects aligned along the second axis.

The lists of tradeable objects displayed along the first and second axes may cooperate to define a product matrix that indicates different combinations of tradeable objects. An indication of a combination of the tradeable objects in the product matrix may be received for defining a trading strategy specifying at least two legs. Contract information related each of the at least two legs specified by the trading strategy may be received at a computing device.

The received contract information related to a first leg of the trading strategy may be displayed parallel to the first axis along which a list of tradeable objects is displayed. The received contract information related to a second leg of the trading strategy may be displayed parallel to the second axis along which a list of tradeable objects is displayed. The contract information related to the first and second legs of the trading strategy may each be organized over a period of time, which may be the same or different.

The contract information related to the first leg may indicate a list of future contracts for the first leg and the contract information related to the second leg may indicates a list of future contracts for the second leg. The first and second periods of time over which the respective contract information related to the first and second legs of the trading strategy may be organized may include an ascending or descending order for the future contracts related to the first and second legs of the trading strategy. The ascending or descending order for the future contracts may be an ascending or descending order of the settlement dates for the future contracts, for example.

The contract information related to the first leg and the contract information related to the second leg may cooperate to define a contract matrix. The product matrix may be displayed in a first view and the contract matrix may be displayed in a second view. An indication of a contract in the contract matrix may be received at a computing device and a trade order may be generated that is related to the contract indicated in the contract matrix. The trade order may be submitted to an electronic exchange.

Market data may be received that is related to each contract in the list of future contracts for the first leg and each contract in the list of future contracts for the second leg. Spread information may be determined based on the received market data related to each contract in the list of future contracts for the first leg and the received market data related to each contract in the list of future contracts for the second leg. The spread information may be displayed in the contract matrix. The spread information may include a price or a net change, for example.

An indication may be received to display contract information related to additional legs of the trading strategy. The indication may be received to display contract information related to a third leg of the trading strategy, for example. The contract information related to the third leg may be received and may be displayed. The displayed contract information related to the third leg may be organized over a third period of time.

The embodiments described herein may be implemented by a computing device. For example, the computing device may comprise a synthetic manager that may be used to implement the embodiments described herein.

II. EXAMPLE ELECTRONIC TRADING SYSTEM

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. EXPANDED EXAMPLE ELECTRONIC TRADING SYSTEM

Figure 2:
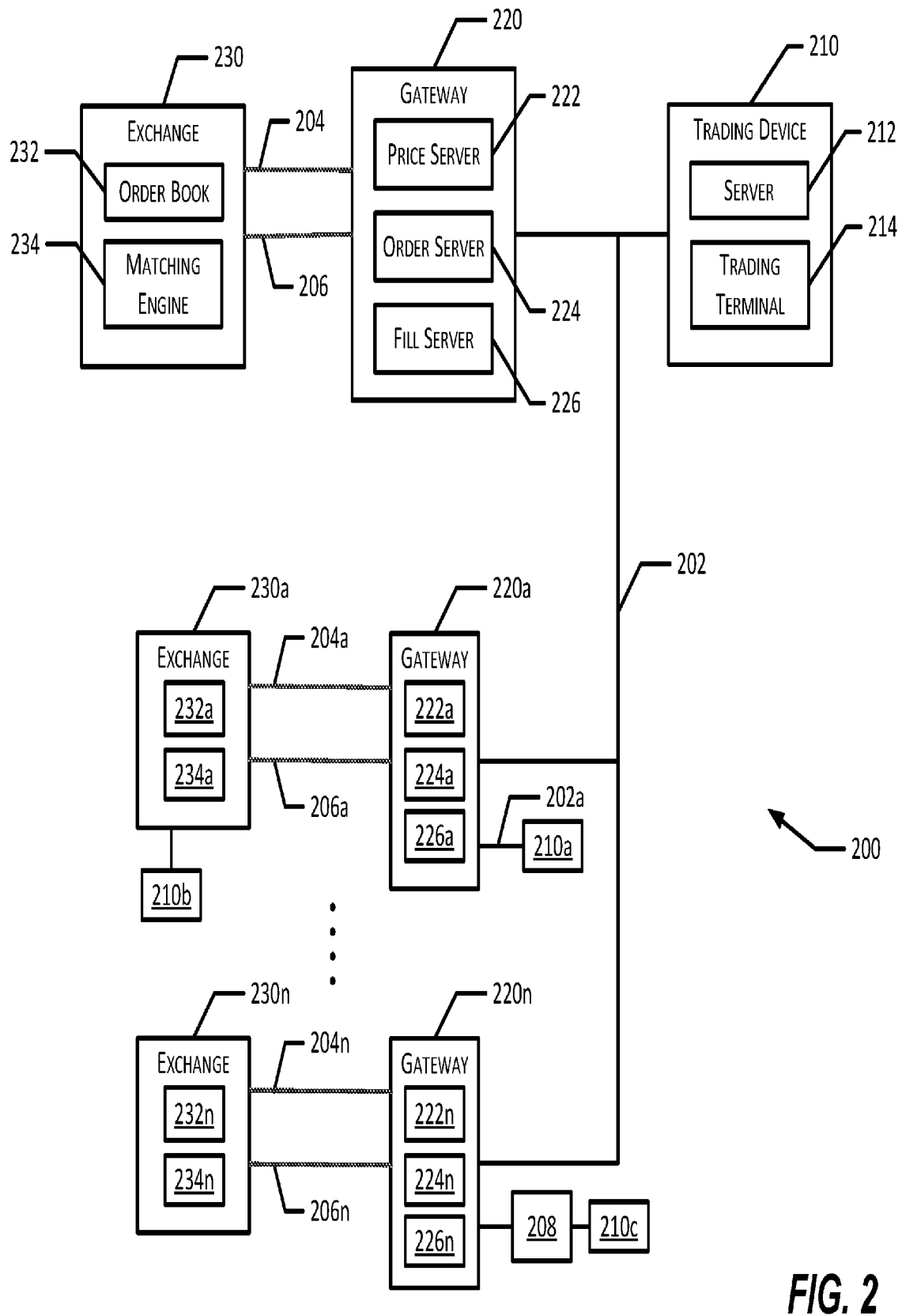
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. EXAMPLE COMPUTING DEVICE

Figure 3:
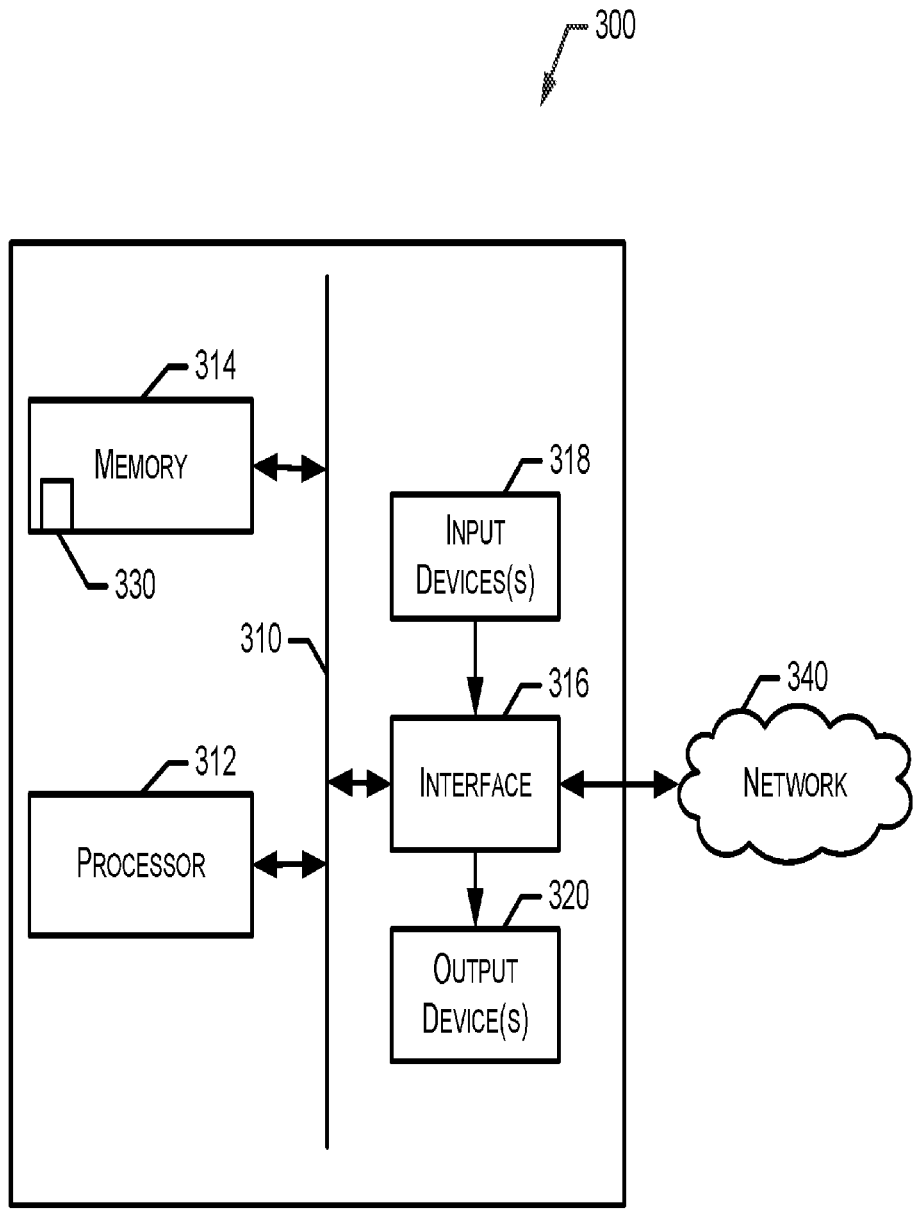
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. STRATEGY TRADING

In addition to buying and/or selling a single tradeable object, a user may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

An automated trading tool may be utilized to trade according to a trading strategy, for example. For example, the automated trading tool may include AUTOSPREADER®, provided by Trading Technologies.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 4:
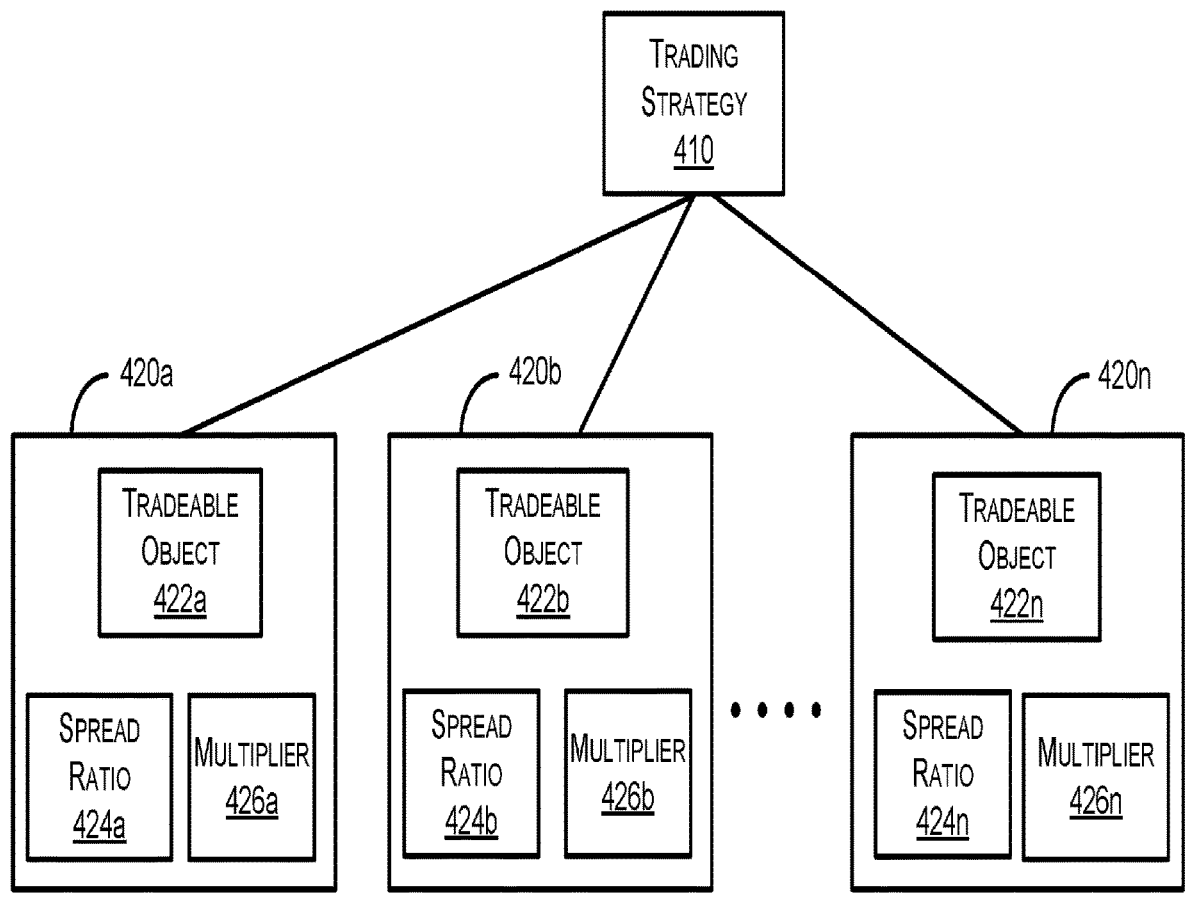
FIG. 4 illustrates a block diagram of a trading strategy, which may be employed with certain disclosed embodiments.

FIG. 4 illustrates a block diagram of a trading strategy 410 which may be employed with certain disclosed embodiments. The trading strategy 410 includes "n" legs 420 (individually identified as leg 420a to leg 420n). The trading strategy 410 defines the relationship between tradeable objects 422 (individually identified as tradeable object 422a to tradeable object 422n) of each of the legs 420a to 420n using the corresponding spread ratios 424a to 424n and multipliers 426a to 426n.

Once defined, the tradeable objects 422 in the trading strategy 410 may then be traded together according to the defined relationship. For example, assume that the trading strategy 410 is a spread with two legs, leg 420a and leg 420b. Leg 420a is for tradeable object 422a and leg 420b is for tradeable object 422b. In addition, assume that the spread ratio 424a and multiplier 426a associated with leg 420a are "1" and that the spread ratio 424b and multiplier 426b associated with leg 420b are "−1". That is, the spread is defined such that when the spread is bought, 1 unit of tradeable object 422a is bought (positive spread ratio, same direction as the spread) and 1 unit of tradeable object 422b is sold (negative spread ratio, opposite direction of the spread). As mentioned above, typically in spread trading the opposite of the definition applies. That is, when the definition for the spread is such that when the spread is sold, 1 unit of tradeable object 422a is sold (positive spread ratio, same direction as the spread) and 1 unit of tradeable object 422b is bought (negative spread ratio, opposite direction of the spread).

The price for the trading strategy 410 is determined based on the definition. In particular, the price for the trading strategy 410 is typically the sum of price the legs 420a-420n comprising the tradeable objects 422a-422n multiplied by corresponding multipliers 426a-426n. The price for a trading strategy may be affected by price tick rounding and/or pay-up ticks. However, both of these implementation details are beyond the scope of this discussion and are well-known in the art.

Recall that, as discussed above, a real spread may be listed at an exchange, such as exchange 130 and/or 230, as a tradeable product. In contrast, a synthetic spread may not be listed as a product at an exchange, but rather the various legs of the spread are tradeable at one or more exchanges. For the purposes of the following example, the trading strategy 410 described is a synthetic trading strategy. However, similar techniques to those described below may also be applied by an exchange when a real trading strategy is traded.

Continuing the example from above, if it is expected or believed that tradeable object 422a typically has a price 10 greater than tradeable object 422b, then it may be advantageous to buy the spread whenever the difference in price between tradeable objects 422a and 422b is less than 10 and sell the spread whenever the difference is greater than 10. As an example, assume that tradeable object 422a is at a price of 45 and tradeable object 422b is at a price of 40. The current spread price may then be determined to be (1)(45)+(−1)(40)=5, which is less than the typical spread of 10. Thus, a user may buy 1 unit of the spread, which results in buying 1 unit of tradeable object 422a at a price of 45 and selling 1 unit of tradeable object 422b at 40. At some later time, the typical price difference may be restored and the price of tradeable object 422a is 42 and the price of tradeable object 422b is 32. At this point, the price of the spread is now 10. If the user sells 1 unit of the spread to close out the user's position (that is, sells 1 unit of tradeable object 422a and buys 1 unit of tradeable object 422b), the user has made a profit on the total transaction. In particular, while the user bought tradeable object 422a at a price of 45 and sold at 42, losing 3, the user sold tradeable object 422b at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 410 at a desired price, the automated trading tool may automatically place an order (also referred to as quoting an order) for one of the tradeable objects 422 of the trading strategy 410 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, and/or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

The leaned on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, typically the orders in the other quoted legs are cancelled and then appropriate hedge orders are placed based on the lean prices that the now-filled quoting leg utilized.

VI. DISPLAY OF INTER-PRODUCT INFORMATION

Figure 5:
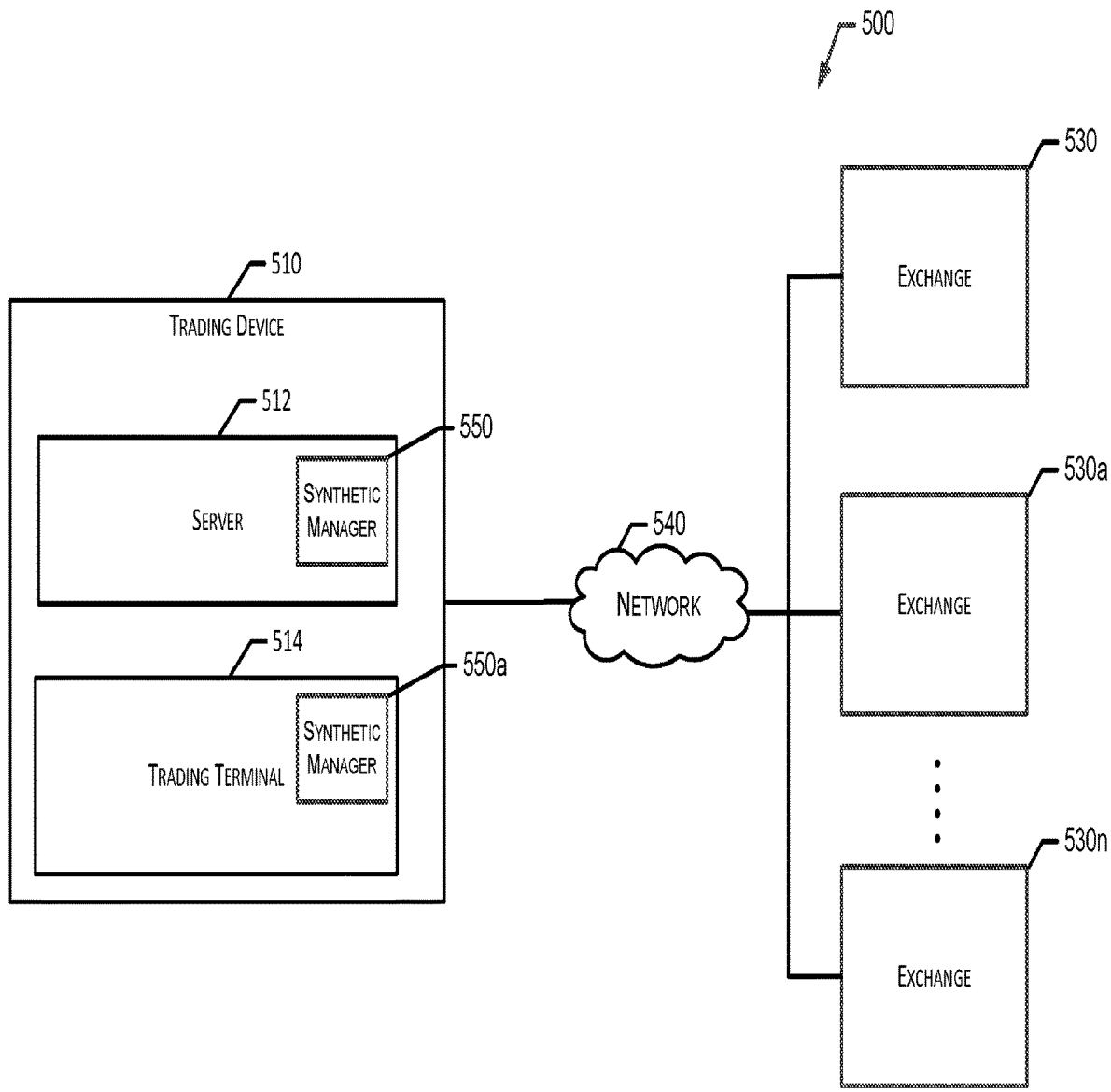
FIG. 5 illustrates an example system that may be used to provide information related to one or more tradeable objects at an electronic exchange.

FIG. 5 illustrates an example system 500 that may be used to provide information related to one or more tradeable objects at an electronic exchange. The system 500 may include a trading device 510 that may submit an order message to one or more exchanges, such as exchanges 530, 530a, and/or 530n, for executing a trade between one or more other trading devices. The trading device 510 may communicate with other trading devices directly and/or through the network 540. The trading device 510 may communicate with the exchange 530 directly or through the network 540.

The trading device 510 may receive market data via the network 540 and generate a display for a providing the market data, or information based on the market data, to a user. The market data may be related to one or more tradeable objects of a synthetic spread that are traded at one or more exchanges.

As illustrated in FIG. 5, the trading device 510 may include a synthetic manager 550 and/or a synthetic manager 550a that may be used to generate a display for the synthetic spread that may identify the various legs of the spread and/or contract information related to the legs of the spread. The synthetic manager 550 and/or a synthetic manager 550a receive user input from the display and may process the user input as described herein. The synthetic manager 550 and the synthetic manager 550a may be independent synthetic managers, or components of a common synthetic manager distributed across multiple computing devices, such as the server 512 and the trading terminal 514, for example. The synthetic manager 550, 550a may be executed as software and/or hardware. For example, the synthetic manager may be a software module executed by a processor from memory at the trading device 510, or an independent hardware module.

The trading device 510 may generate the display indicating one or more tradeable objects in a synthetic spread based on market data received from multiple exchanges (e.g., two or more of exchanges 530-530n). The display may be generated at the server 512 and/or the trading terminal 514 for being displayed at the trading terminal 514.

Figure 6A:
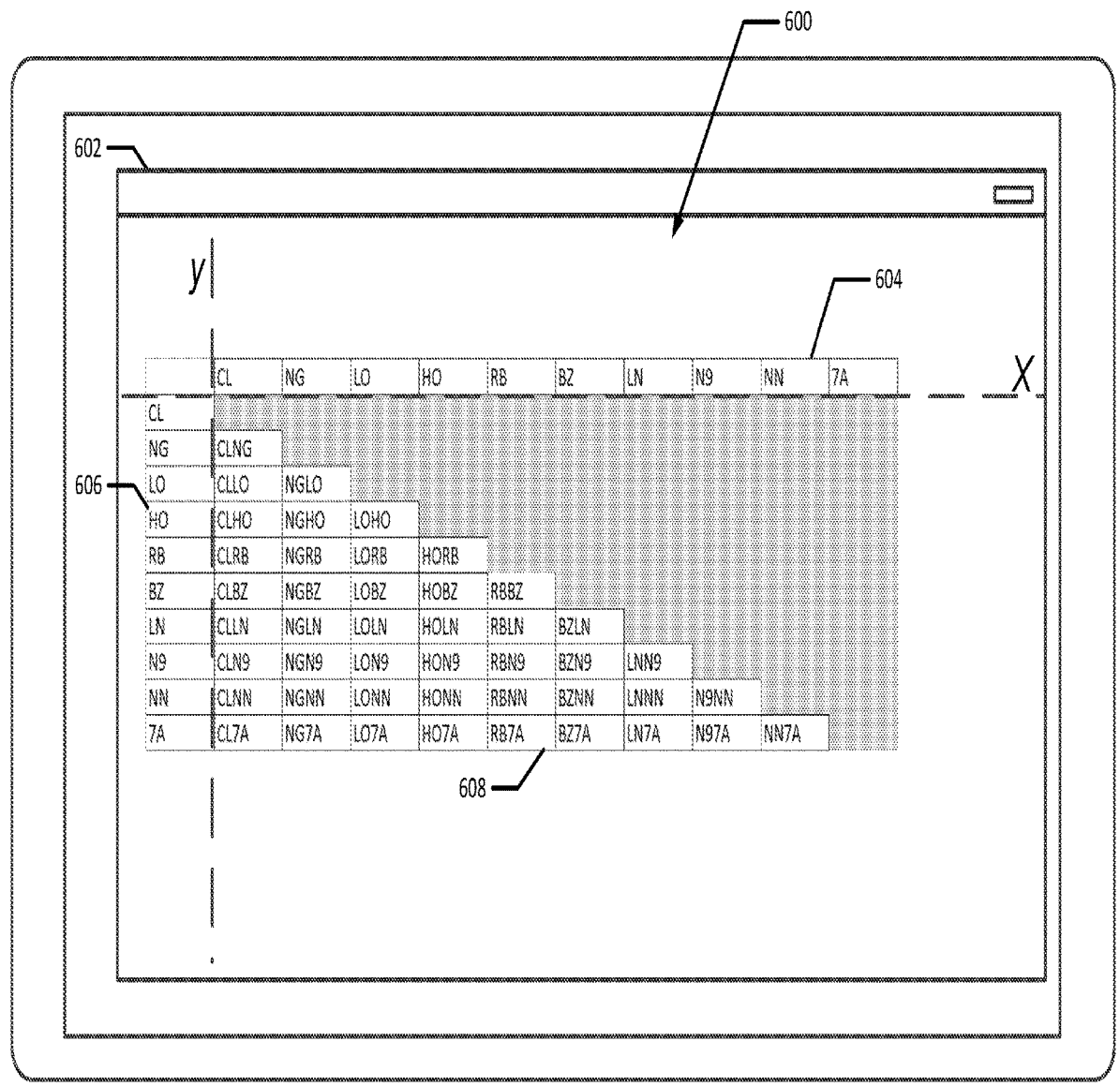
FIGS. 6A and 6B are example display configurations that may be used to display a configuration of tradeable objects for defining a trading strategy.

FIG. 6A is an example display configuration 600 that may present a configuration of tradeable objects for defining a trading strategy. As shown in FIG. 6A, the display configuration 600 may be included in a user interface 602. The user interface 602 may be a display window embedded in a trading application such as the trading application 330. The display configuration 600 may include a list of tradeable objects 604 and a list of tradeable objects 606. Each list of tradeable objects 604 and 606 may include the same or different products, types of products, and other groupings of products offered at an electronic exchange. The electronic exchange on which the list of tradeable objects 604 may be traded may be the same or different than the electronic exchange on which the list of tradeable objects 606 may be traded. As shown in the display configuration 600, each tradeable object in the list of tradeable objects 604 and the list of tradeable objects 606 is identified with an abbreviation.

The list of tradeable objects 604 and a list of tradeable objects 606 may be pre-selected by a user. Each list of tradeable objects 604, 606 may correspond to a given electronic exchange. In certain embodiments, each list of tradeable objects 604, 606 may correspond tradeable objects offered at different markets on a common electronic exchange. Each list of tradeable objects 604, 606 may be a filtered list (e.g., filtered by the user) of the tradeable objects at an exchange or an entire list of tradeable objects offered at an exchange.

The list of tradeable objects 604 is displayed along an x-axis, while the list of tradeable objects 606 is displayed orthogonal to the list of tradeable objects 604 along a y-axis. Each of the tradeable objects identified in the list of tradeable objects 604 and the list of tradeable objects 606 may be combined into a plurality of cells that form a product matrix 608 which identifies combinations of tradeable objects that may be used to define synthetic spreads. Each cell contains a combination of tradeable objects that may be identified by a combination of the abbreviations of the tradeable objects offered at an exchange.

The combinations of tradeable objects corresponding to a tradeable object in the list of tradeable objects 604 may be displayed in the y-direction below the tradeable object. For example, the combinations of tradeable objects including the tradeable object represented by the abbreviation CL in the list of tradeable objects 604 are displayed in a list of cells in the y-direction below the tradeable object having the abbreviation CL. The combinations of tradeable objects corresponding to each tradeable object in the list of tradeable objects 606 may be displayed in the x-direction next to the tradeable object. For example, the combinations of tradeable objects including the tradeable object represented by the abbreviation NN in the list of tradeable objects 606 are displayed in a list of cells in the x-direction to the right of the abbreviation NN. The display configuration 600 removes the combinations of the same tradeable object (e.g., CLCL) from the product matrix 608. The display configuration 600 removes the duplicate combinations of tradeable objects from the product matrix 608 to display each combination of tradeable objects a single time in the product matrix 608.

Figure 6B:
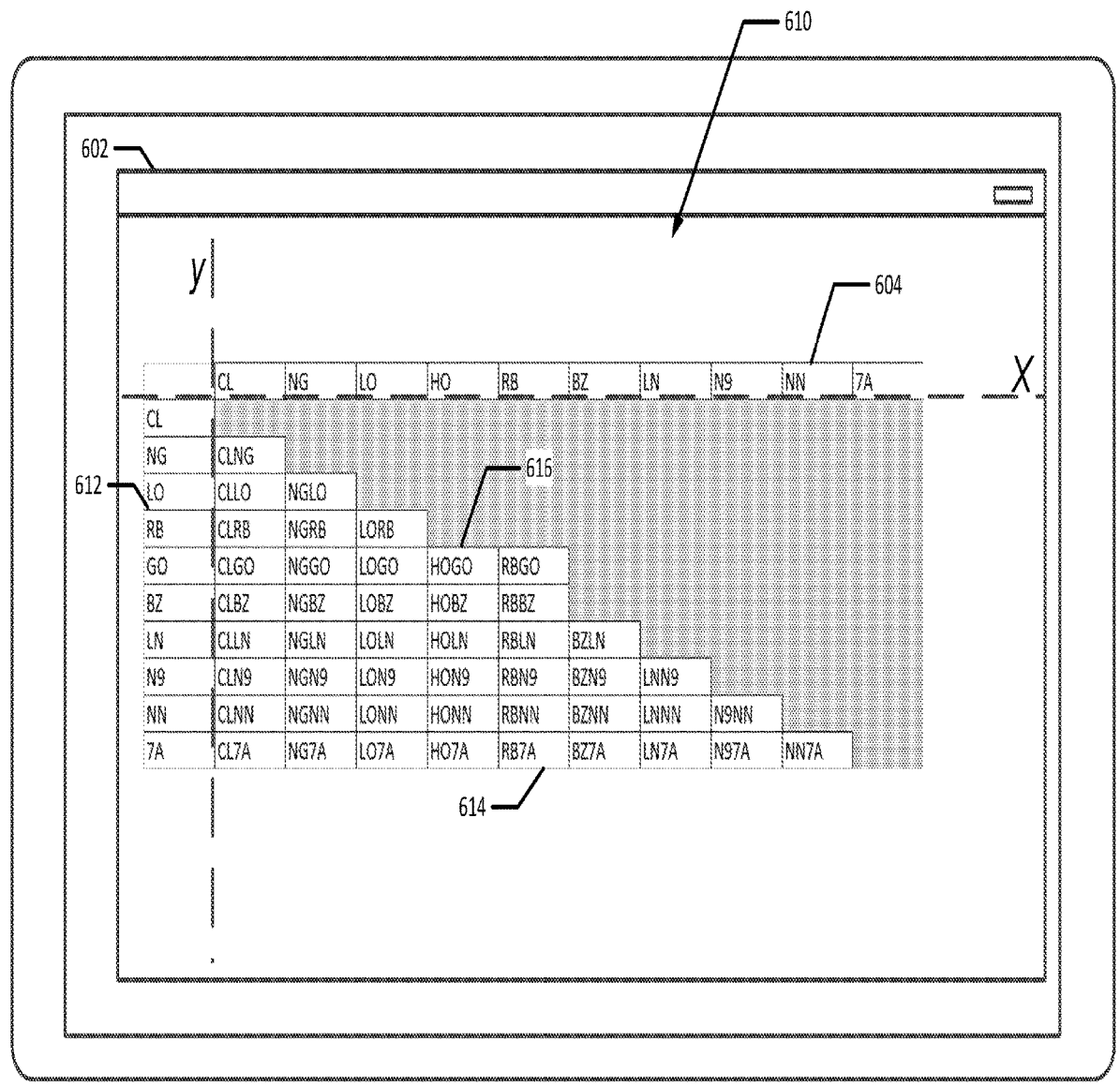

The list of tradeable objects 604 and 606 in the display configuration 600 shown in FIG. 6A are the same. FIG. 6B is another example display configuration 610 that may display a configuration of tradeable objects for defining a trading strategy. The display configuration 610 may include the list of tradeable objects 604 and a different list of tradeable objects 612. Each list of tradeable objects 604 and 612 includes different tradeable objects offered at an electronic exchange. As shown in the display configuration 610, each tradeable object in the list of tradeable objects 604 and the list of tradeable objects 606 is identified with an abbreviation.

The display configuration 610 is similar to the display configuration 600. The list of tradeable objects 604 and the list of tradeable objects 612 are combined into a plurality of cells to form a product matrix 614, which is different from the product matrix 608 due to the list of tradeable object 612 being different from the list of tradeable objects 606. The product matrix 608 and the product matrix 614 allow multiple combinations of tradeable objects for defining a trading strategy to be displayed in the user interface 602. The product matrix 608 may allow the display of each combination of products for defining a synthetic spread using the products in the lists of tradeable objects 604 and 606, and the product matrix 614 may allow for the display of each combination of products for defining a synthetic spread using the products in the lists of tradeable objects 604 and 612.

Each combination of tradeable objects in the product matrix 608 and the product matrix 614 may be selectable by a user to define a trading strategy specifying multiple legs of a trading strategy. The selection of a combination of tradeable objects in the product matrix may trigger the display of contract information for each leg of the trading strategy defined by the selected tradeable objects. For example, if the user selects the combination of tradeable objects 616 (e.g., HOGO), contract information related to the tradeable objects 616 may be displayed. The contract information may be displayed in user interface 602 or a separate interface.

Figure 7:
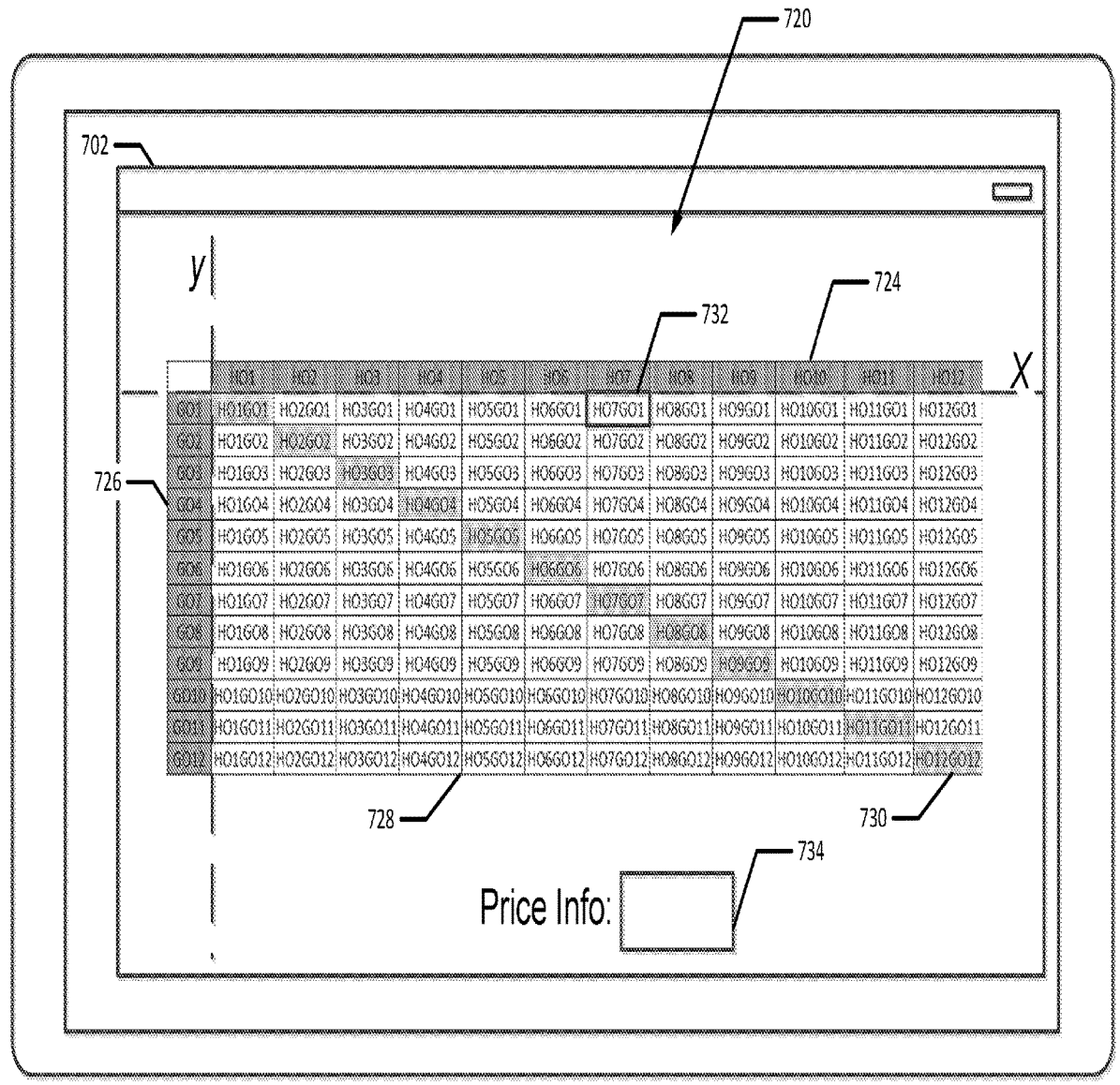
FIG. 7 is an example display configuration that may be used to display a configuration of contract information for multiple tradeable objects.

FIG. 7 is an example display configuration 720 that may display a configuration of contract information for multiple tradeable objects. As shown in FIG. 7, the display configuration 720 may be included in a user interface 702. The user interface 702 may be a display window embedded in a trading application. The display configuration 720 may include contract information 724 for a first leg (leg A) of a trading strategy and contract information 726 for a second leg (leg B) of the trading strategy. The contract information 724 and 726 may each be organized over a period of time. The period of time for the contract information 724 and 726 may be ascending or descending. The period of time for the contract information 724 and 726 may be the same or different. The period of time may be pre-defined and/or user-defined.

As shown in FIG. 7, the contract information 724 and 726 identify future contracts for leg A and leg B, respectively, in monthly increments for a year. The monthly increments may be contract settlement dates. As shown in the display configuration 720, each monthly contract in the contract information 724 and the contract information 726 may be identified by the tradeable object for each leg (e.g., in the form of an abbreviation) and the contract month. Though the contract month may be displayed in FIG. 7, any other contract period may be displayed.

The contract information 724 is displayed along an x-axis, while the contract information 726 is displayed orthogonal to the contract information 724 along a y-axis. Each of the monthly contracts identified in the contract information 724 and the contract information 726 may be combined to form a contract matrix 728 that may identify spread information for the contracts identified in the contract information 724 and the contract information 726. The spread information may identify combinations of future contracts that may be used to define synthetic spreads. Each combination of future contracts may be identified by a combination of the abbreviations of the tradeable objects offered at an exchange and an indication of the months of the future contracts indicated in each cell of the contract matrix 728.

The future contract spreads corresponding to each contract month for the tradeable object in the contract information 724 may be displayed in the y-direction below the contract month. For example, the synthetic spreads including the tradeable object and contract month represented by the abbreviation HO1 in the contract information 724 are displayed in a list of cells in the y-direction below the abbreviation HO1. The future contract spreads corresponding to each contract month for the tradeable object in the contract information 726 may be displayed in the x-direction next to the contract month. For example, the synthetic spreads including the tradeable object and contract month represented by the abbreviation GO1 in the contract information 726 are displayed in a list of cells in the x-direction to the right of the abbreviation GO1.

The spread information in the contract matrix 728 allows multiple tradeable spreads to be displayed in the user interface 702. The contract matrix 728 may allow for the display of each combination of contracts for defining a synthetic spread between the tradeable objects identified in the contract information 724 and the contract information 726. The spread information and/or the contract information 724, 726 may show the contracts that are expiring nearest in time with the earliest month indicator (e.g., "1") or the earliest month indicator may indicate the earliest month of the year (e.g., January). The contracts may increase in time with each subsequent month indicator (e.g., 2-12). The contracts 730 identified on the diagonal of the contract matrix 728 may be identified as the contracts for each tradeable object in the same time period. The contracts in the x-direction of the contracts 730 may show an increase in the spread for the tradeable object identified in the contract information 724. The contracts in the y-direction of the contracts 730 may show an increase in the spread for the tradeable object identified in the contract information 726.

The spread information listed in each of the cells making up the contract matrix 728 may identify one or more contracts. The spread information may identify the price of a spread. For example, a user may select or hover over a contract month for each tradeable object (e.g., a cell) in the contract matrix 728, such as the contract month 732, to show the name and/or price of the spread. The name and/or price may be displayed as a pop-up on the user interface 702 or in the price information display area 734. The user may select two different contract months for tradeable objects (e.g., cells) in the contract matrix 728 to view the difference between each spread, which may be displayed in the price information display area 734. In another example, the name and/or price of each spread may be displayed in the corresponding cells in the contract matrix 728 as a default that may be toggled by the user.

Additional spread information may be determined and/or displayed in the interface 702. For example, a net change, a last bid price, a current bid price, a midpoint, and/or other spread information for a given contract may be displayed in the contract matrix 728 or elsewhere in the user interface 702 for each identified spread contract.

The spread information may be received in the market data or generated from the market data at a computing device, e.g., at the synthetic manager. This spread information may be provided as options that the user may select to be able to view upon selection or as defaults that may be displayed in each instance of the user interface 702. The options may be provided in a dropdown box upon selection of the contract months for tradeable objects (e.g., cells) in the contract matrix 728. Allowing the user to view such information for each spread may allow a user to view whether prices are increasing or decreasing in future contracts and make quick and educated decisions from the user interface 702.

Figure 8:
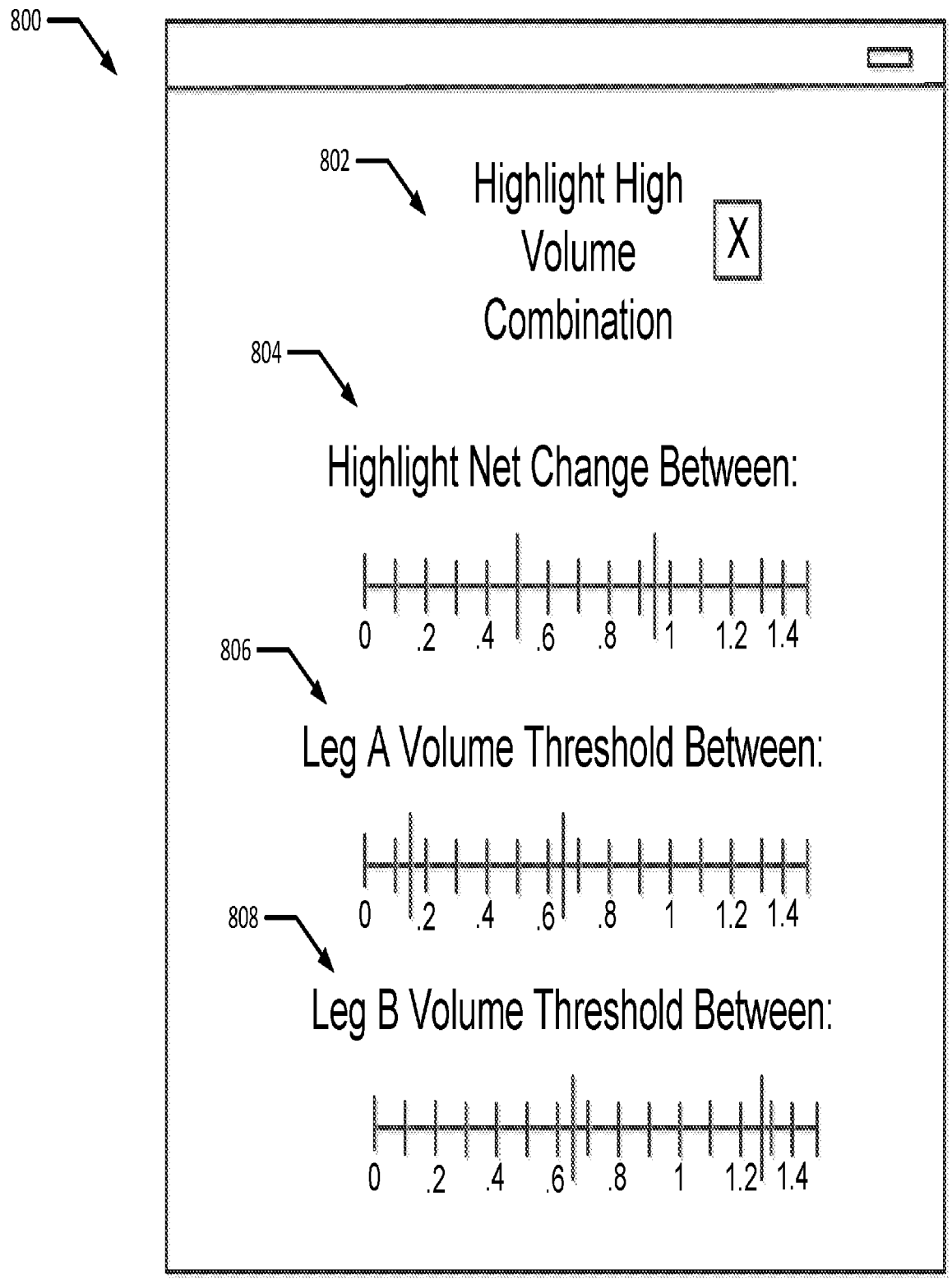
FIG. 8 is an example user interface that may be used to select parameters for identifying spread information.

FIG. 8 is an example user interface 800 that may be used to select parameters for identifying spread information, such as the spread information in the contract matrix 728 for example. As shown in FIG. 8, a user may select a parameter to have the high volume combinations identified using the high volume combination indicator 802. This may enable display of the spread combinations having a volume above a pre-defined level. The pre-defined level may be user-defined or system-defined.

The user interface 800 may include a net change indicator 804. The net change indicator 804 may allow a user to select parameters for the spread combinations that have a net change between certain pre-defined price values, such that the spread combinations having the selected net change may be identified in the contract matrix 728. The net change indicator 804 may take user input in the form of a sliding bar that enables the user to select the range of net change for the spread combinations to be identified in the contract matrix 728. The spread combinations coming outside of the identified range may not be identified in the contract matrix 728. Though the user interface 800 shows the net change indicator 804 in the form of a sliding bar, the net change indicator 804 may similarly receive user input in the form of a text box, a drop down menu, or another function for receiving user input.

The user interface 800 may include leg volume threshold indicators 806 and/or 808. The leg volume threshold indicators 806 and 808 may allow a user to select parameters for the spread combinations that have a net change between certain pre-defined price values, such that the spread combinations having the selected volume threshold may be identified in the contract matrix 728. Each leg volume threshold indicator 806 and 808 may correspond to a different leg identified in the contract information of the contract matrix 728. For example, the leg volume threshold indicator 806 may correspond to the leg identified in the contract information 724 and the leg volume threshold indicator 808 may correspond to the leg identified in the contract information 726. The leg volume threshold indicators 806 and 808 may take user input in the form of a sliding bar that enables the user to select the range of volume thresholds for each leg of the spreads to be identified in the contract matrix 728. The legs of the spreads coming outside of the identified volume range may not be identified. Though the user interface 800 shows the leg volume threshold indicators 806 and 808 in the form of a sliding bar, the leg volume threshold indicators 806 and 808 may similarly receive user input in the form of a text box, a drop down menu, or another function for receiving user input. Also, though the user interface 800 shows leg volume threshold indicators 806 and 808 for two legs of a trading strategy, any number of leg volume threshold indicators may be implemented based on the number of legs in a trading strategy.

The parameters selected in the user interface 800 may result in certain spread information in the contract matrix 728 being identified. For example, the high volume combinations over a pre-defined volume, the net changes within a pre-defined range, and the leg volume thresholds within a pre-defined range may be identified in the contract matrix 728. The identification of the spread information may be implemented by highlighting the spread information (e.g., cells) in the contract matrix 728 that meets the parameters selected in the user interface 800. In another example, the spread information (e.g., cells) in the contract matrix 728 that meet the selected parameters may be displayed, while the spread information (e.g., cells) in the contract matrix 728 that does not meet the selected parameters may be faded out a certain percentage or may not be displayed altogether. The selections made in the user interface 800 may be implemented as a user default for each instance that a contract matrix is displayed, or may otherwise be displayed to modify the contract matrix.

Figure 9:
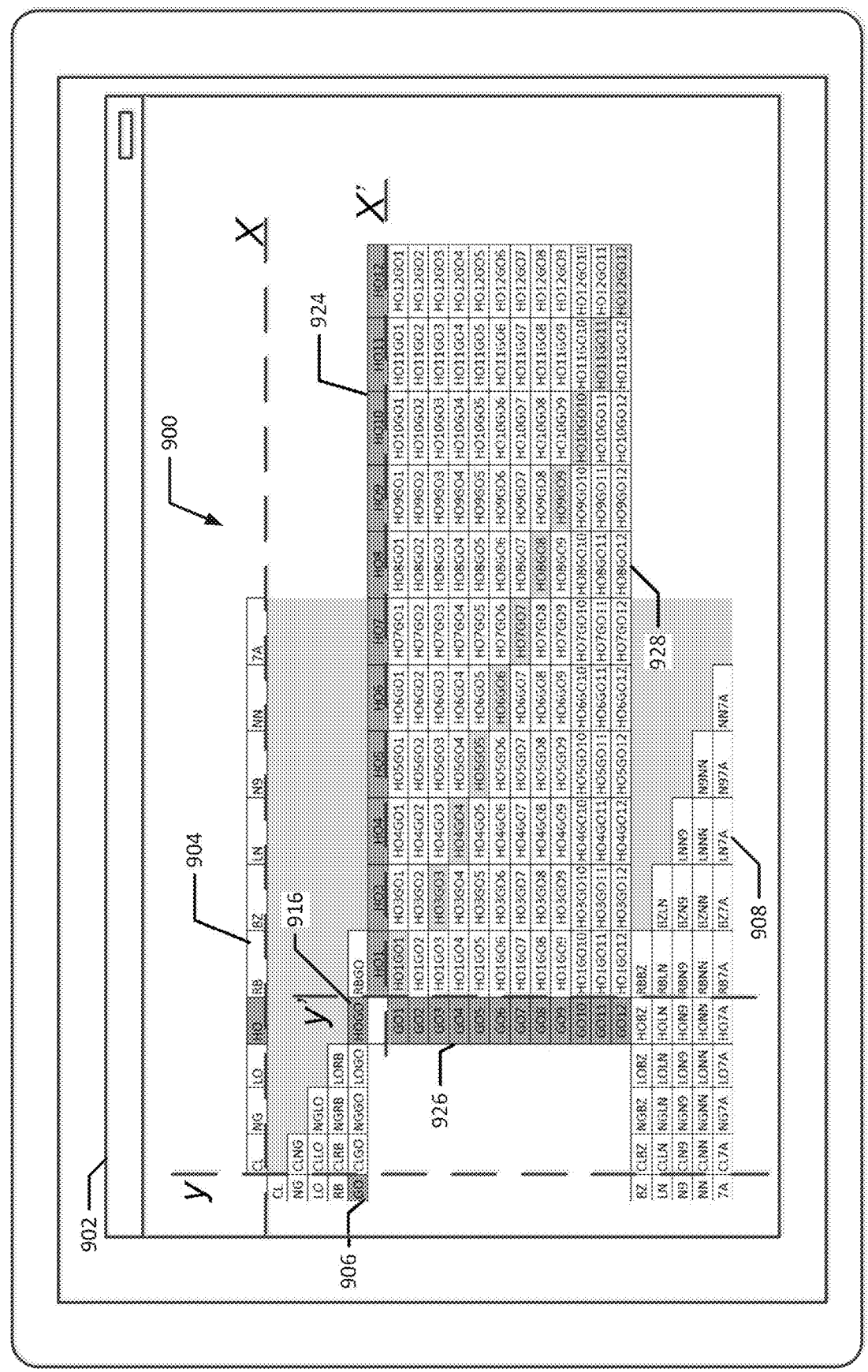
FIG. 9 is an example display configuration that may be used to display a configuration of tradeable objects for defining a trading strategy and spread information associated with the tradeable objects.

FIG. 9 is an example display configuration 900 that may display a configuration of tradeable objects for defining a trading strategy and spread information associated with the tradeable objects. As shown in FIG. 9, the display configuration 900 may be included in a user interface 902. The user interface 902 may be a display window embedded in a trading application. The display configuration 900 may include a list of tradeable objects 904 and a list of tradeable objects 906. Each of the tradeable objects identified in the list of tradeable objects 904 and the list of tradeable objects 906 may be combined to form a product matrix 908 that may identify combinations of tradeable objects that may be used to define synthetic spreads.

As shown in the display configuration 900, a combination of tradeable objects 916 in the product matrix 908 may be selected to generate contract information 924, 926 and/or a contract matrix 928 for the combination of tradeable objects 916. The contract information 924 may identify the monthly contracts for leg A of the combination of tradeable objects 916 and the contract information 926 may identify the monthly contracts for leg B of the combination of tradeable objects 916. The contract information 924, 926 and/or a contract matrix 928 may be displayed as a pop-out layer of information embedded in the product matrix 908. The contract information 924 for the tradeable object identified in the list of tradeable objects 904 may be displayed along an x'-axis that is parallel to the x-axis on which the list of tradeable objects 904 is displayed. The contract information 926 may be displayed along a y'-axis that is parallel to the y-axis on which the list of tradeable objects 906 is displayed. The contract information 924 and 926 may be combined to form the contract matrix 928 that may identify synthetic spread information for future contracts related to the combination of tradeable objects 916. The tradeable objects in the combination of tradeable objects 916 may be highlighted or otherwise identified in the product matrix 908. Each tradeable object in the combination of tradeable objects 916 may also be highlighted or otherwise identified in the list of tradeable objects 904 and/or the list of tradeable objects 906.

The display configuration 900 may allow for the product matrix 908 for each combination of tradeable objects in the lists of tradeable objects 904, 906 to be displayed in the same user interface 902 as the contract information 924, 926 and/or the spread information in the contract matrix 928 for a certain combination of tradeable objects 916.

The user interface 902 may display price information for the spread contracts identified in the contract matrix 928, as described herein. The user may select one or more spread contracts in the user interface 902 to display additional information related to the spread contract and/or generate a trade order related to the spread contract. The trade order may be generated according to the defined trading strategy at a computing device, e.g., at the synthetic manager, and may be submitted to an electronic exchange.

The display configuration 900 may be displayed as a subsequent view of the display configuration 610. For example, a user may view the display configuration 610 and may select the combination of tradeable objects 616 to display a subsequent view having the display configuration 900 in which the contract information 924, 926 and/or the contract matrix 928 may be presented.

Though the display configuration 900 shows different combinations of tradeable objects and contract information related to two legs of a trading strategy, a similar display may be provided for any number of legs of a trading strategy. For example, each list of tradeable objects 904, 906 may represent a user-defined selection including one or more tradeable objects such as an exchange traded spread, and a user-defined spread. In this way, each of the tradeable objects 904, 906 may represent multiple combinations of other tradeable objects to be displayed in the product matrix 908. Similarly the contract information 924, 926 may include combinations of one or more contract months to allow additional combinations of spread contracts to be displayed.

Figure 10:
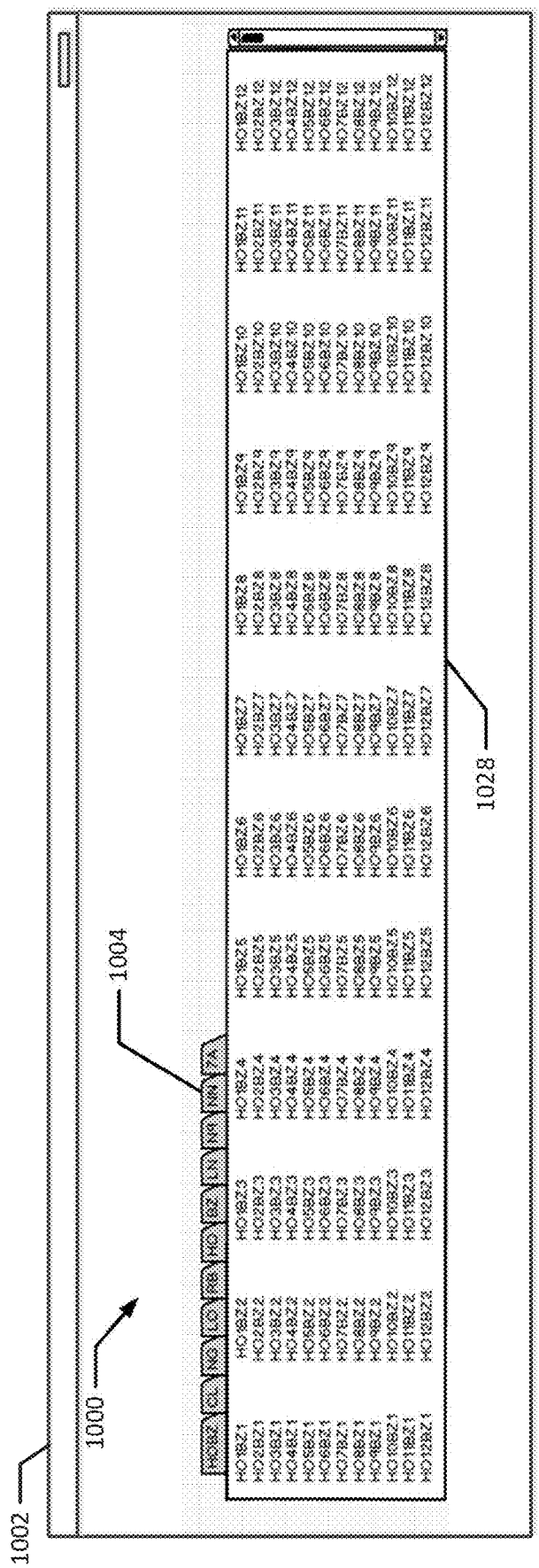
FIG. 10 is an example display configuration that may be used to display a configuration of tradeable objects for defining a trading strategy and spread information associated with the tradeable objects.

FIG. 10 is an example display configuration 1000 that may display a configuration of tradeable objects for defining a trading strategy. As shown in FIG. 10, the display configuration 1000 may be included in a user interface 1002. The display configuration 1000 may be a tabular configuration that includes a list of tradeable objects 1004 in different tabs. The tradeable objects in the list of tradeable objects 1004 may be offered at an electronic exchange. Each tradeable object in the list of tradeable objects 1004 may be paired with a pre-selected tradeable object to identify multiple legs of a trading strategy. For example, in the user interface 1002, the tradeable object HO may be pre-selected by a user and may be paired with one or more of the tradeable objects in the list of tradeable objects 1004 to identify multiple legs of a trading strategy. The multiple legs that are identified may be used to generate the spread information 1028.

The spread information 1028 may identify the monthly spreads between the pre-selected tradeable object (e.g., HO) and the tradeable object identified in the tabular list of tradeable objects 1004 (e.g., BZ). The spread information 1028 may identify the monthly spreads for different tradeable objects in the tabular list of tradeable objects 1004 upon the user selection of different tabs corresponding to the tradeable objects. The pre-selected tradeable object (e.g., HO) and/or the list of tradeable objects 1004 may be pre-selected by a user. The pre-selected tradeable object may be selected by a user from a list of tradeable objects that correspond to a given electronic exchange. The list of tradeable objects 1004 may be a filtered list (e.g., filtered by the user) of the tradeable objects at an exchange or an entire list of tradeable objects offered at an exchange.

Figure 11:
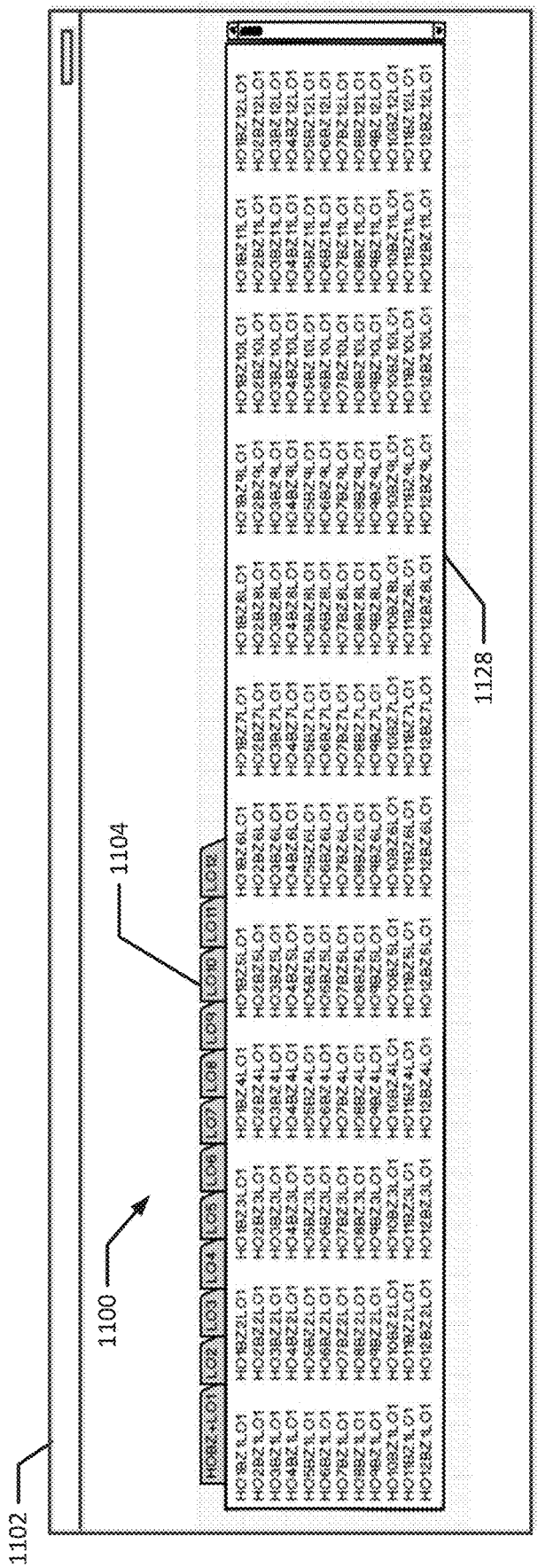
FIG. 11 is an example display configuration that may be used to display a configuration of contract information for multiple tradeable objects.

FIG. 11 is an example display configuration 1100 that may display a configuration of contract information for multiple tradeable objects. The display configuration 1100 may be used to display spread information 1128 for three legs of a trading strategy. As shown in FIG. 11, the display configuration 1100 may be included in a user interface 1102. The display configuration 1100 may be a tabular configuration that includes contract information 1104 for a pre-selected tradeable object (e.g., LO) in different tabs for a third leg of a trading strategy. The contract information 1104 may be displayed in a tabular list of months (e.g., from earliest expiring contract in time to latest or the calendar months of the year). Each monthly contract in the contract information 1104 may be paired with the monthly contracts for two other pre-selected tradeable objects to identify the monthly spreads for three legs of a trading strategy. For example, in the user interface 1102, the tradeable objects HO and BZ may be pre-selected by a user and may be paired with the monthly contracts for a third tradeable object (e.g., LO) to identify the spread information 1128 for the three legs of a trading strategy.

The pre-selected tradeable objects (e.g., HOBZ and LO) may be pre-selected by a user. The first two pre-selected tradeable objects may be defined by the tabular list of tradeable objects 1004 shown in FIG. 10 and may be combined with another pre-selected tradeable object selected by a user from the tradeable objects at a given exchange. The pre-selected tradeable objects may be selected from a list of tradeable objects, a drop-down box, a text box, or another user input function.

The spread information 1128 may be built from the spread information 1028 shown in FIG. 10. For example, a user may select the tab defining the two legs of a trading strategy in the tabular list of tradeable objects 1004. The spread information 1028 may be generated and displayed for the two legs of the trading strategy. The user may indicate that the user would like to view the spread information for a third leg and/or identify a third leg of the trading strategy. The identification of the third leg of the trading strategy may prompt the display of the spread information 1128 and/or the contract information 1104 that show the information for the third leg.

In another example, a user may select the first two legs in a product matrix. The spread information may be displayed for the two legs of the trading strategy selected in the product matrix. The user may indicate that the user would like to view the spread information for a third leg and/or identify a third leg of the trading strategy. The third leg of the trading strategy may be identified in a list of tradeable objects. The identification of the third leg of the trading strategy may prompt the display of the spread information 1128 and/or the contract information 1104 that show the information for the third leg.

The spread information 1028 and 1128 may be displayed in a contract matrix or in the sequential lists as shown in FIGS. 10 and 11. Upon selecting one of the spread contracts in the spread information 1028 or 1128, price information or other information related to the identified spread may be displayed. The spread information 1028 and 1128 may also be displayed according to predefined parameters as described herein. Though FIGS. 10 and 11 show a display configuration for displaying spread information for two and three legs, respectively, spread information may be similarly displayed for any number of legs of a trading strategy.

Figure 12:
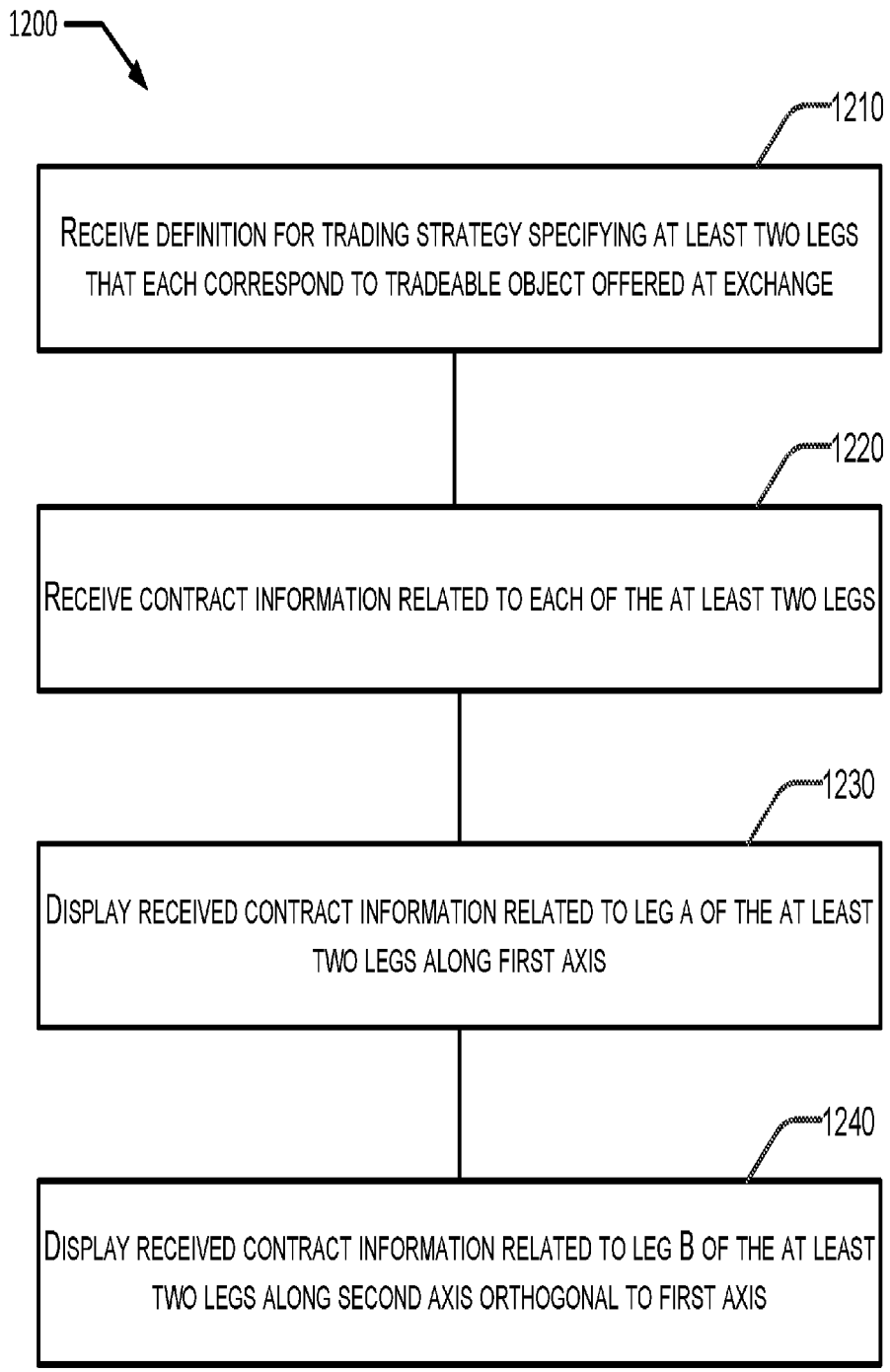
FIG. 12 is a flow diagram depicting an example method for displaying information related to a trading strategy.

FIG. 12 is a flow diagram depicting an example method 1200 for displaying information related to a trading strategy. The method 1200, or portions thereof, may be performed by one or more computing devices, such as a trading device or another computing device. In an example, the method 1200, or portions thereof, may be performed by a synthetic manager residing at one or more computing devices.

At 1210, a definition for a trading strategy may be received. The trading strategy may include two or more legs that each correspond with a tradeable object that may be offered at an exchange. Contract information may be received, at 1220, that may be related to each of the two or more legs. The contract information related to a leg A of the trading strategy may be displayed, at 1230, along an axis in a display configuration. At 1240, the contract information related to a leg B of the trading strategy may be displayed along another axis in the display configuration. The axis along which leg B is displayed may be orthogonal to the axis along which leg A is displayed.

As described herein, leg A and leg B of the trading strategy may be displayed along orthogonal axes to create a contract matrix. The contract matrix may include spread information for future contracts corresponding to each leg of the trading strategy. Though the method 1200 indicates that contract information may be displayed that is related to two legs of a trading strategy, contract information related to any number of legs of a trading strategy may be displayed. For example, contract information related to multiple legs of a trading strategy may be displayed along one or more axes.

Figure 13:
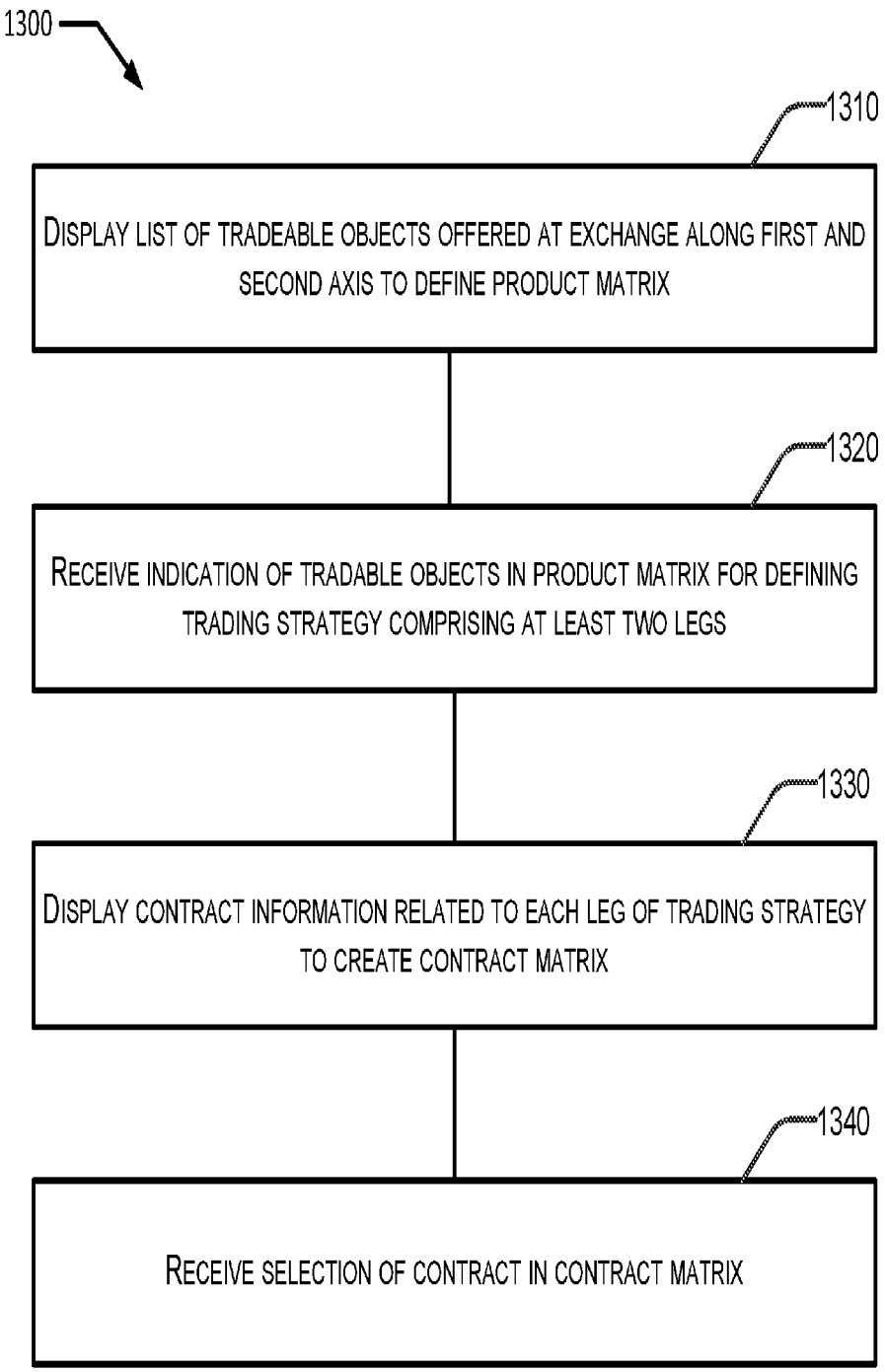
FIG. 13 is a flow diagram depicting another example method for displaying information related to a trading strategy.

FIG. 13 is a flow diagram depicting an example method 1300 for displaying information related to a trading strategy. The method 1300, or portions thereof, may be performed by one or more computing devices, such as a trading device or another computing device. In an example, the method 1300, or portions thereof, may be performed by a synthetic manager residing at one or more computing devices.

At 1310, two lists of tradeable objects offered at an exchange may be displayed along orthogonal axes to define a product matrix. The product matrix may include the combinations of tradeable objects displayed along the orthogonal axes. An indication of a combination of tradeable objects in the product matrix may be received, at 1320, to define a trading strategy including two or more legs. Contract information may be displayed, at 1330, that is related to each leg of the trading strategy defined at 1320. The contract information may identify future monthly contracts for the legs of the trading strategy. The contract information may create a contract matrix that includes spread information that indicates the future spread contracts for each of the legs of the trading strategy. At 1340, an indication of a contract in the contract matrix may be received. Based on the indication of the contract, price information may be displayed. Based on the indication of the contract at 1340, a trade order and/or a user prompt to send a trade order to an exchange may be generated. The trade order may be sent when the user indicates that the user would like to submit the trade order to the exchange.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A system comprising:
a computer device, wherein the computer device is configured to:
display a plurality of product cells forming a product matrix, wherein each product cell of the plurality of product cells is aligned along a first axis and a second axis, wherein each location along the first axis corresponds to a product in a first list of products, wherein each location along the second axis corresponds to a product in a second list of products, wherein each product cell of the plurality of product cells represents a combination including the corresponding product along the first axis and the corresponding product along the second axis;
receive a selection of a product cell in the product matrix, wherein the selected product cell corresponds to a first product in the first list of products and a second product in the second list of products;
display, in response to receiving the selection of the product cell, a plurality of contract cells forming a contract matrix, wherein each contract cell of the plurality of contract cells is aligned along a third axis and a fourth axis, wherein each location along the third axis corresponds to a contract for the first product, wherein each location along the fourth axis corresponds to a contract for the second product, wherein each contract cell of the plurality of contract cells represents a combination including the corresponding contract along the third axis and the corresponding contract along the fourth axis;
receive a selection of a contract cell in the contract matrix, wherein the selected contract cell corresponds to a trading strategy including a plurality of legs, wherein a first leg of the plurality of legs for the trading strategy is for the contract for the first product, wherein a second leg of the plurality of legs for the trading strategy is for the contract for the second product; and
send, in response to receiving the selection of the contract cell, an order for the trading strategy.

2. The system of claim 1, wherein the first list of products is the same as the second list of products.

3. The system of claim 1, wherein the product matrix is displayed in a first view, wherein the contract matrix is displayed in a second view.

4. The system of claim 1, further including instruction executable to:
receive market data related to each contract associated with each contract cell of the plurality of contract cells;
determine spread information for each contract cell of the plurality of contract cells based on the market data for the corresponding contracts; and
display the spread information in the corresponding contract cell of the plurality of contract cells.

5. The system of claim 4, wherein the spread information includes a price or a net change.

6. The system of claim 1, wherein the contracts for the first product corresponding to each location along the third axis are organized in one of (i) ascending order and (ii) descending order of contract month, wherein the contracts for the second product corresponding to each location along the fourth axis are organized in one of (i) ascending order and (ii) descending order of contract month.

7. The system of claim 1, wherein the contracts for the first product corresponding to each location along the third axis are organized in one of (i) ascending order and (ii) descending order of settlement date, wherein the contracts for the second product corresponding to each location along the fourth axis are organized in one of (i) ascending order and (ii) descending order of settlement date.

8. The system of claim 1, wherein the trading strategy is a spread.

9. The system of claim 1, wherein the trading strategy includes a third leg for a contract for a third product.

* * * * *